United States Patent [19]

Neudecker

[11] Patent Number: 5,256,022
[45] Date of Patent: Oct. 26, 1993

[54] SUCTION DEVICE FOR REMOVING X-RAY SHEET FILMS

[75] Inventor: Karl Neudecker, München, Fed. Rep. of Germany

[73] Assignee: Agfa-Gevaert AG, Leverkusen, Fed. Rep. of Germany

[21] Appl. No.: 854,248

[22] Filed: Mar. 20, 1992

[30] Foreign Application Priority Data

Mar. 22, 1991 [DE] Fed. Rep. of Germany ....... 4109352

[51] Int. Cl.[5] .............................................. B65H 3/10
[52] U.S. Cl. .................... 414/416; 414/331; 414/752; 271/107
[58] Field of Search ............... 414/331, 416, 627, 728, 414/737, 752, 411; 271/9, 106, 107; 378/173, 182, 184

[56] References Cited

U.S. PATENT DOCUMENTS

| | | | |
|---|---|---|---|
| 4,248,417 | 2/1981 | Fujimoto | 271/107 X |
| 4,449,705 | 5/1984 | Shibuya et al. | 271/9 |
| 4,759,679 | 7/1988 | Müller | 414/416 |
| 4,775,138 | 10/1988 | Müller | 271/9 |
| 4,856,955 | 8/1989 | Yaguchi et al. | 414/331 X |
| 4,878,799 | 11/1989 | Seto et al. | 414/416 X |
| 5,080,343 | 1/1992 | Kushima et al. | 414/331 X |

FOREIGN PATENT DOCUMENTS

| | | | |
|---|---|---|---|
| 0402492 | 12/1990 | European Pat. Off. | 378/182 |
| 0415421 | 3/1991 | European Pat. Off. | 378/182 |
| 3610660 | 4/1987 | Fed. Rep. of Germany | |
| 0211242 | 9/1986 | Japan | 271/107 |
| 0008139 | 1/1987 | Japan | 378/173 |

Primary Examiner—Michael S. Huppert
Assistant Examiner—James Keenan
Attorney, Agent, or Firm—Michael J. Striker

[57] ABSTRACT

A suction device for removing X-ray sheet films from a dispenser magazine of an X-ray sheet film cassette loading and unloading device has at least two suction elements and is displaceable so that for withdrawing an X-ray sheet film from a dispenser magazine it is movable to a withdrawal position, the withdrawn X-ray sheet film is taken from the suction device by a transporting roller pair, and a control device controls the transporting movement of the suction device and a tranasporting roller pair as well as the opening and closing of the dispenser magazine. The suction elements are arranged on a suction element axle which is movable in two displaceable suction element axial bearings, a lifting basket is articulately connected to a base plate by four hinge members, and a drive element is arranged on the base plate and moves the lifting basket and the suction element axle.

5 Claims, 2 Drawing Sheets

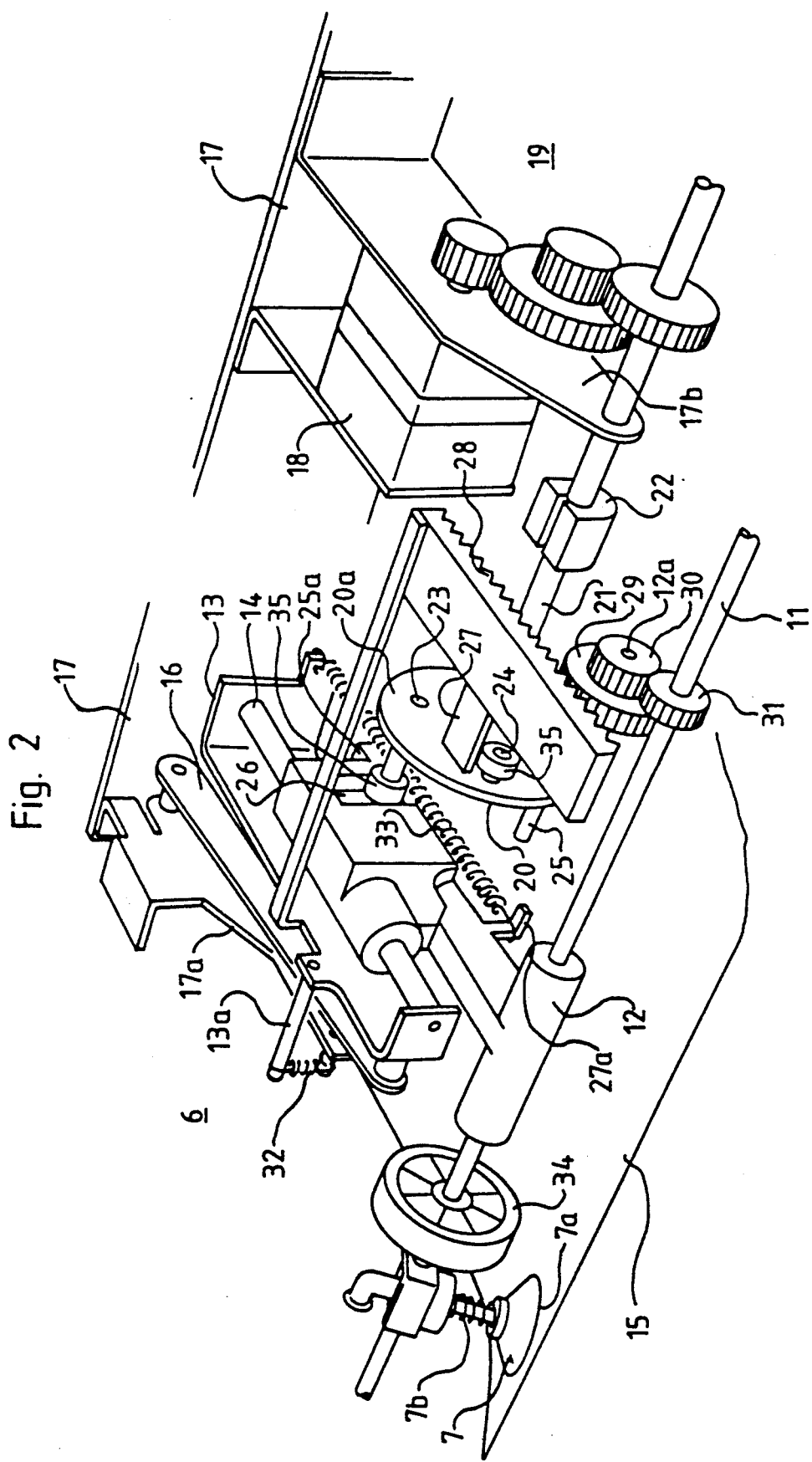

SUCTION DEVICE FOR REMOVING X-RAY SHEET FILMS

BACKGROUND OF THE INVENTION

The present invention relates to a suction device for removing X-ray sheet films from one of several dispenser magazines of an X-ray sheet film cassette loading and unloading apparatus.

An X-ray sheet film cassette loading and unloading apparatus which is provided with a suction device is disclosed for example in the German Patent 3,610,660. In this device a suction element is arranged on an angular lever. The angular lever is supported rotatably about an axis which extends parallel to the upper surface side or to a front edge of an X-ray sheet film stack and is fixably connected with a base plate. Furthermore, the angular plate engages the pin or a spring with a toothed segment which is also rotatable about an axis of the angular lever. The toothed segment engages with the toothed wheel mounted on a shaft of a motor. The motor for moving the suction element is fixedly arranged on the base plate.

A spring-biased pin is arranged on the base plate and in particular on its end which faces toward the X-ray sheet film stack. During placing of the suction device on an X-ray sheet film stack, the pin is displaced against the force of the spring element. This displacement is detected by means of a proximity or microswitch and blocks the placing movement of the suction device. The suction element now lies on the uppermost sheet film of the X-ray sheet film stack and holds it by suction by means of a vacuum pump. After this holding by suction, the motor is activated and the suction member is turned by 90° by means of the toothed gear and toothed segment and the sheet film is pressed against the suction member by a pressing plate. The X-ray sheet film adhered by suction is bent around a point in which the pin abuts. The bending radius approximately corresponds to the length of the angular lever. When the X-ray sheet film adheres by suction and is bent, the suction device in which the base plate is connected with the transporting device is moved away of the X-ray sheet film stack. The above described suction device in accordance with the prior art has the disadvantage that the bending radius during rolling of the X-ray sheet film cassette from the task is relatively great and therefore with a predetermined film stiffness the tendency for peeling off of a film which adheres to the sucked film is relatively low. In addition, during the rolling of the sheet film from the stack, the film is pressed against the stack at the point where the pin abuts, and a transporting movement of the suction device is first released when the turning movement of the suction member is finished. Therefore no continuous rolling-off or releasing movement of the X-ray sheet film from the X-ray sheet film stack is produced.

SUMMARY OF THE INVENTION

Accordingly, it is an object of the present invention to provide a suction device of the above mentioned general type, which avoids the disadvantages of the prior art.

More particularly, it is an object of the present invention to provide a suction device which is designed so that rolling off movement of a sheet film which lies on an X-ray sheet film stack and adheres by suction of the suction device is continuously transferred into a releasing movement or lifting movement, and the releasing movement is continuously transferred into a transporting movement of the suction device or the X-ray sheet film, so that the X-ray sheet film removed from the stack is simultaneously lifted from the X-ray sheet film stack.

In keeping with these objects and with others which will become apparent hereinafter, one feature of the present invention resides, briefly stated, in a suction device in which a suction element is arranged on a suction element axis, the suction element axis is supported rotatably in two suction element axial bearings, the suction element axial bearings are each movable on a guide arranged in a lifting basket parallel to a plane of X-ray sheet film to be removed, the lifting basket is articulately connected with a base plate by four link members in the form of double parallelograms and is movable substantially perpendicularly to the plane of the X-ray sheet film to be removed, a drive element is arranged on the base plate and drives two drive pulleys through a transmission and two drive pulley axles, the drive pulleys are fixedly connected each with the drive pulley axle arranged on the base plate perpendicularly to the suction element axial bearings, the drive pulley axles are connected by a rigid coupling, each drive pulley has a guiding pin, a lifting pin and a blocking pin, each guiding pin of each drive pulley engages in a coulisse each fixedly connected with the suction element axial bearing, the lifting pin which is arranged at the drive pulley surface side opposite to the guiding pin engages a lifting surface of the lifting basket, a toothed rod is fixedly arranged on the lifting basket and engages with a first toothed gear, a second toothed gear which is coaxial with the first toothed gear is fixedly connected with the first toothed gear and engages with a third toothed gear fixedly connected with the suction element axle, the suction element axial bearings are drawable along their sides by a first pulling spring in direction toward the lifting basket, and the lifting basket is loaded during the removal of an X-ray sheet film with a spring force of a second pulling spring arranged between the lifting basket and the base plate, so that the guiding pin, the lifting pin, the coulisse and the lifting surface remain in engagement with one another.

When the suction device is designed in accordance with the present invention, it eliminates the disadvantages of the prior art and provides for the above mentioned highly advantageous results.

In accordance with another advantageous feature of the present invention, the drive element is formed as a stepper motor.

Still another feature of the present invention is that a ball bearing is arranged on each of guiding pins and lifting pins.

Finally, still a further feature of the present invention is that transporting roller members are arranged on the suction element axle, in a rotatable manner at least in correspondence with the suction element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a broken partial view of the suction device in accordance with the present invention showing a left side of the device, while a mirror image of the left side exits on the right side.

DESCRIPTION OF THE PREFERRED EMBODIMENT

Figure 1:
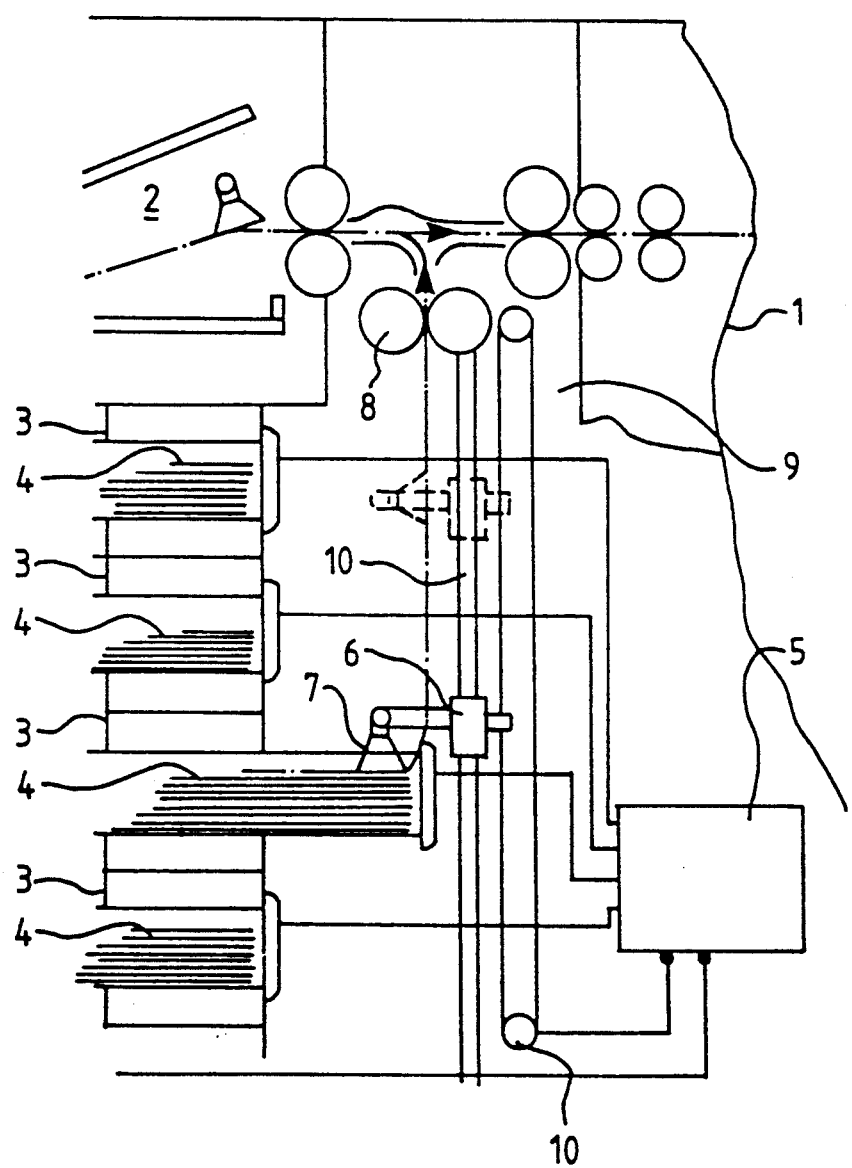
FIG. 1 is a view schematically showing a section of an X-ray sheet film cassette loading and unloading apparatus with a schematically shown suction device in accordance with the present invention.

FIG. 1 shows an X-ray sheet film cassette loading and unloading apparatus 1, an X-ray sheet film cassette 2, several dispenser magazines 3 and X-ray sheet film stacks for accommodating them. It also shows a control device 5, a suction device 6, a suction element 7, a transporting roller pair 8, a transporting shaft 9, and means for moving the suction device 10.

The suction device shown in FIG. 2 has a suction element axle 11 and suction element axial bearing 12, a lifting basket 13, a guide 14 for the suction element axial bearing 12. An X-ray sheet film is identified with reference numeral 15. The device further has a link member 16, a base plate 17, a drive element 18 mounted on the base plate 17, a transmission 19, a drive pulley 20 and a drive pulley axle 21. The drive element 18 can be formed as a stepper motor. Also the device has a rigid coupling 22, a guiding pin 23, a lifting pin 24 and a blocking pin 25. Further, there is a coulisse or block 26, a lifting surface 27, a toothed rack 28, a first toothed gear 29, a second toothed gear 30, a third toothed gear 31, a pulling spring 32 and a pulling spring 33.

The operation of the X-ray sheet film cassette loading and unloading apparatus 1 which uses the suction device 6 in accordance with the present invention is as follows:

An X-ray sheet film cassette to be loaded or unloaded is inserted in the not shown sluice gate of the loading and unloading device 1. It is positioned to be opened and unloaded. After the positioning the format and the film type of the X-ray sheet film accommodated in the X-ray sheet film cassette 2 must be determined. A controlling device 5 for controlling the loading and unloading process opens, after positioning of the X-ray sheet film cassette and during the opening and unloading of the cassette, the dispenser magazine 4 with the corresponding X-ray sheet film and moves the inventive suction device 6, 7 to a removing position. In this position, the suction element 7 of the suction device 6 can adhere by suction the upper X-ray sheet film 15 of an X-ray sheet film stack 4. When the suction device 6 releases the X-ray sheet film 15 from the X-ray sheet film stack 4, it transports the X-ray sheet film 15 to a transporting roller pair 8, from which the sheet film is transported further to the X-ray sheet film cassette 2 to be loaded.

The movement process of the inventive suction device 6 during the release of the X-ray sheet film 15 from the X-ray sheet film stack 4 is as follows: In the initial position of the suction device at the beginning of the removing process the lifting basket 13 is located opposite to the base plate 17 on which it is pivotally connected by four link members 16 in a double-paralellogram fashion, in its deepest position. The suction element axial bearing 12 which is displaceable along its guide 14 relative to the lifting basket 13 is in this position close to the lifting basket. In its deepest position, the lifting basket 13 is retained by two pulling springs 32. Correspondingly, the suction element axial bearing 12 is retained in its position close to the lifting basket by two pulling springs 33. The pulling springs 32 are mounted with one end on a pin 13a and a first angle 17a while the pulling springs 33 are mounted on the lifting basket 13 and on the corresponding suction element axial bearing 12. The suction surface 7a of the suction element 7 extends in this condition of the suction device 6 perpendicularly to the plane of an X-ray sheet film 15 to be removed. A guiding pin 23 of each of both drive pulleys 20 is in engagement with each coulisse 26 which is fixedly connected with the suction element axial bearing 12.

When the control device 5 after the positioning of the X-ray sheet film cassette 2 recognizes the format and the type of the X-ray sheet film required for loading of the cassette and opens the corresponding dispenser magazine 3, it activates the movement of the suction device 6 with the element 10 and the suction device 6 moves from its rest position in the direction toward the open dispenser magazine 3. At the same time the control device 5 activates the drive element 18 which is fixedly connected with the base plate 17. The drive element 18 drives through the transmission 19 the drive pulley shafts 21 which are also connected with the base plate 17 through a second angle 17b. The drive pulley shafts 21 of both drive pulleys 20 are connected with one another rigidly by the coupling 22. With the coupling 22 the adjusting of both drive pulleys 20 fixedly connected with their shafts is performed. Therefore the manufacturing tolerances are compensated.

The drive element 18 is activated b the control device 5 so that it is further moved in the coulisse 26 by the guiding pin 23 which is in engagement with the coulisse 26. The suction element axial bearing 12 are displaced along the respective guide 14 from their position close to the lifting basket. For reducing the friction between the guiding pin 23 and the coulisse 26 a ball bearing 35 is fitted on each guiding pin 23.

Then suction element axial bearing 12 or the suction axle 11 are moved by the drive element 18, drive pulley 20, and coulisse 26 along the guide 14 from the lifting basket 13, the suction axle 11 and therefore the suction element 7 rotates about 90° in a plane extending parallel to the X-ray sheet film cassette stack. Thereby the suction surfaces 7a of the suction 7 are no longer in their initial position in which they extend perpendicularly to the plane of an X-ray sheet film 15 to be removed. Instead they are located in a parallel position relative to the X-ray sheet film 15.

The rotary movement of the suction element axle 11 is obtained by the toothed rack 28 mounted on the lifting basket 13, a first toothed gear 29, as second toothed gear 30, a third toothed gear 31. The first toothed gear 29 and the second toothed gear 30 are connected fixedly with one another and coaxial with one another. They are supported rotatably about an axle 12a which is fixedly connected with a suction element axial bearing 12. The first toothed gear 29 engages with the toothed gear 28. When, as described, the suction element axial bearing 12 is displaced along the guide 14 to the position remote from the lifting basket or to the X-ray sheet film removing position, the suction element axial bearing 12 and thereby the first toothed gear 29 as well as the second toothed gear 30 move relative to the lifting basket 31 and thereby to the gear rack 28. Since the first toothed gear 29 engages with the toothed rack 28, this leads to a rotary movement of the first and second toothed gears. The third toothed gear 31 which engages with the second toothed gear 30, takes this rotary movement and transfers it to the suction element axle 11 on which it is fixedly arranged and thereby to the suction element 7. This means for rotation of the suction element axle 11 can be arranged arbitrarily on one of the suction element axial bearings 12.

The above described movement which brings the suction surface 7a of the suction element 7 to a position parallel to the plane of the X-ray sheet film 15 to be removed, takes place during the time in which the control device 5 moves the suction device 6 by the element 10 to an open dispenser magazine 3. In this position the lifting basket 13 is locked by the locking pin 25 and a first locking surface 25a so that it cannot perform any relative movement with respect to the base plate 17.

The suction element 7 is fixedly connected with the suction element axle 11 which is supported rotatably in the suction element axial bearings 12. It is movable perpendicularly to the same and also to the suction surface 7a against the force of a suction element spring 7b. When the suction element 7 is placed on the X-ray sheet film 15 to be removed, it is displaced against the force of the suction element spring 7b. This displacement is detected by a not shown micro or proximity switch and supplied to the control device 5. Thereby the control device 5 registers the placement of the suction device 6 on the X-ray sheet film stack 4 and stops the movement of the suction device 6. The control device 5 activates a not shown vacuum pump, and the suction element 7 adheres by suction to the X-ray sheet film 15.

When the X-ray sheet film 15 is adhered, the control device 5 controls the drive element 18 so that the suction element axial bearing 12 is moved back in direction of the pulling spring 33 to its position close to the lifting basket, under the action of the guiding pin 23 which engages in the coulisse 26. During this movement the suction element 7 is turned back to its original position in which the suction surface 7a extends perpendicularly to the upper side of the X-ray sheet film stack 4. This movement of the suction element axle 7 results in that the X-ray sheet film 16 is bent around the outer surface of the transporting roller piece 34. This rolling of the X-ray sheet film 15 from the X-ray sheet film stack 4, when the rolling radius is determined by the transporting roller piece 34 and the distance of the suction element 7 from the suction element axle 11 leads to the fact that an X-ray sheet film which eventually adheres to the X-ray sheet film 15 is peeled off. Since the bending force increases with the film stiffness and reducing rolling radius, it is advantageous with a predetermined film stiffness to design the suction device 6 with smaller X-ray sheet film rolling radius. Thereby the peeling off of an adhering X-ray sheet film is reliably obtained. In the inventive suction device 6 it is achieved in an advantageous manner.

After the suction element surface 7a has been brought to a position perpendicular to the upper side of the X-ray sheet film stack 4, and eventually adhering X-ray sheet film had time for peeling off, the drive element 18 is moved further to the original position. Therefore the guiding pin 23 is moved out of the coulisse 26 and each lifting pin 24 which is arranged on each drive pulley on its drive pulley side 20a opposite to the respective guiding pin 23 comes into contact with the lifting surface 27 fixedly connected with the lifting basket 13, and the lifting basket 13 is lifted against the force of the pulling spring 32. The rolling movement of the X-ray sheet film 15 from the stack changes into a releasing movement. During the lifting of the lifting basket 13 the suction element 7 moves along a circular arc with a curvature determined by the link member 16 which connects the lifting basket 13 with the base plate 17. This lifting movement ends when the guiding pin 23 abuts against a second blocking surface 27a.

Before the releasing movement is fully completed by lifting of the lifting basket 13, the control device 5 controls the member 10 for moving the suction device 6 so that the suction device 6 is moved back from the open dispenser magazine 3 and thereby from the X-ray sheet film stack 4, and thereby the releasing movement is progressed or transferred into a pulling movement.

The control device 5 moves the suction device 6 until the X-ray sheet film 16 is completely withdrawn from the X-ray sheet film stack 4 and transferred to a transporting roller pair 8. The transporting roller pair 8 transports the X-ray sheet film 15 with the proper format in proper film type for loading an X-ray sheet film cassette. During the transfer of the X-ray sheet film 15 to the transporting roller pair 8, the suction element 7 must release the X-ray sheet film 15 and must not slide on it during further transportation. This is achieved in that the curvature and the center point of the circular arc along which the lifting basket 13 moves when it lifts the lifting pin 24 is selected so that the front edge of the X-ray sheet film 15 is offset at the end of the lifting movement toward the transportation path or toward the transporting roller pair 8. Thereby, during the X-ray sheet film transfer the film front edge which is engaged by the roller of the transporting roller pair 8 located close to the suction device is pulled by the suction element 7 back into the transporting path. After the X-ray sheet film 15 is transferred to the transporting roller pair 8, the control device 5 closes the opened dispenser magazine 3 from which the X-ray sheet film 15 was removed.

A film-improving release or pulling of an X-ray sheet film from an X-ray sheet film stack is also possible with the inventive suction device.

It will be understood that each of the elements described above, or two or more together, may also find a useful application in other types of constructions differing from the types described above.

While the invention has been illustrated and described as embodied in a suction device for removing X-ray sheet films, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A suction device for removing X-ray sheet films from one of several dispenser magazines of an X-ray sheet film cassette loading and unloading device, comprising suction elements; a suction element axle on which said suction elements are arranged; two suction element axial bearings in which said suction element axle is rotatably supported; a lifting basket having a lifting surface; guides arranged in said lifting basket so that said suction element axial bearings are movable on said guides parallel to the plane of an X-ray sheet film to be removed; a base plate, said lifting basket being articulately connected with said base plate in a double-parallelogram fashion and is movable substantially perpendicular to a plane of the X-ray sheet film to be removed; a drive element arranged on said base plate; two drive pulleys driveable by said drive element and connected with one another, each of said drive pulleys having a guiding pin and lifting pin and a blocking pin and having a drive pulley side; a coulisse fixedly connected wit each of said suction element axial bearings, each of said guiding pins of each of said drive pulleys engaging in said coulisse, said lifting pins being arranged on said drive pulley surface which is opposite to said guiding pin and engaging said lifting surface of said lifting basket; a toothed rack fixedly arranged on said lifting basket; a first toothed gear engaging with said toothed rack, a second toothed gear extending coaxially to said first gear and fixedly connected with the latter; a third toothed gear fixedly connected with said suction element axle and engaging with said second toothed gear; a first pulling spring drawing said suction element axial bearings along said guides in direction toward said lifting basket; a second pulling spring arranged between said lifting basket and said base plate and loading said lifting basket with a spring force during the removal of an X-ray sheet film so that said guiding pin, said lifting pin, said coulisse and said lifting surface remain in engagement with one another.

2. A suction device as defined in claim 1; and further comprising two drive pulley axles and a transmission arranged so that said drive element drives said drive pulleys through said transmission and said drive pulley axles, said drive pulleys being fixedly connected with said drive pulley axles, said drive pulley axles being arranged on said base plate perpendicularly to said suction element axial bearings; and a rigid coupling connecting said drive pulley axles with one another.

3. A suction device as defined in claim 1, wherein said drive element is formed as a stepper motor.

4. A suction device as defined in claim 1; and further comprising a ball bearing arranged on each of said guiding pins and said lifting pins .

5. A suction device as defined in claim 1; and further comprising transporting roller pieces arranged rotatably on said suction element axles in correspondence with said suction elements.

* * * * *